Nov. 22, 1949  M. MERZ  2,488,599
CENTRIFUGAL CLUTCH
Filed March 24, 1945
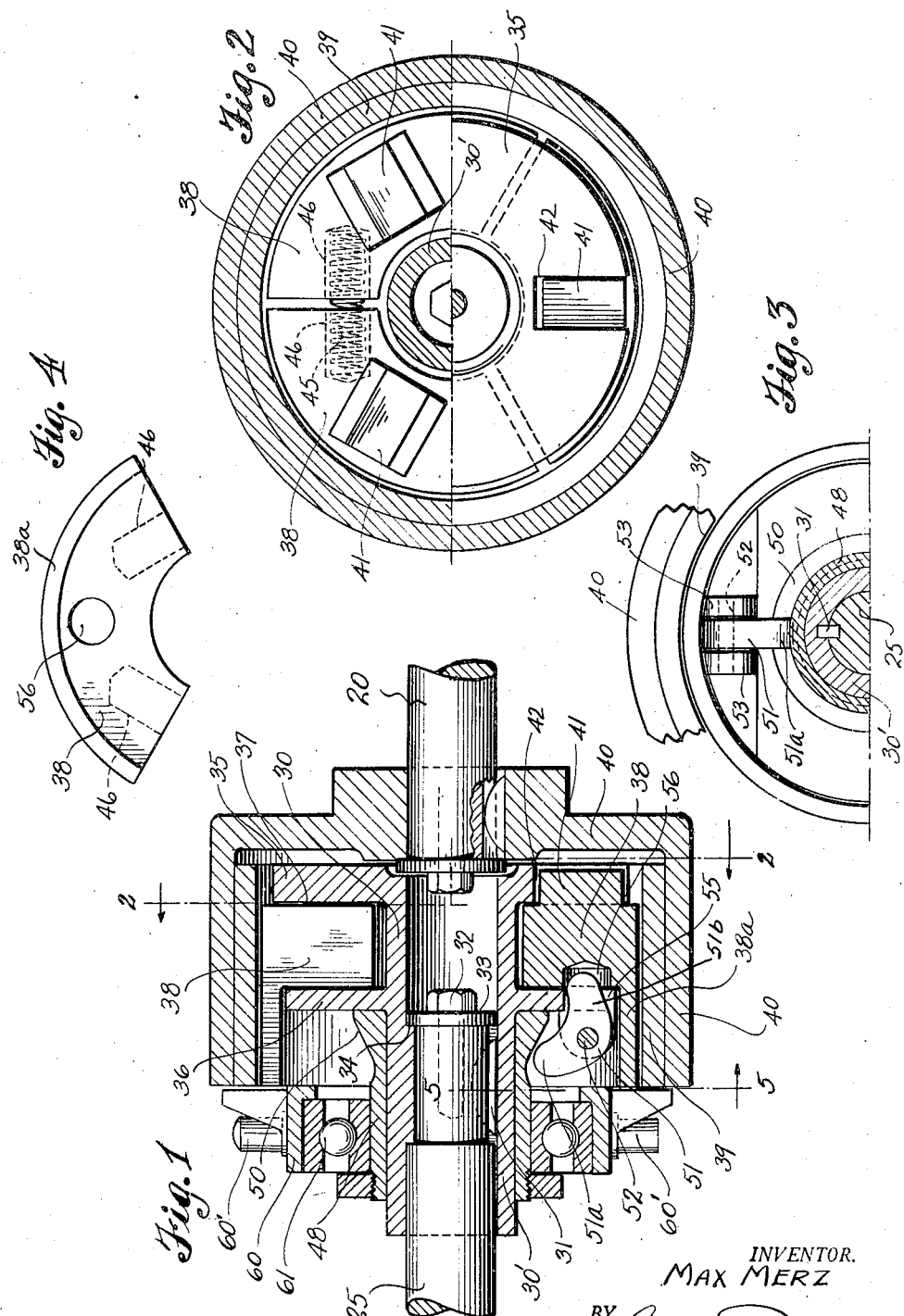
INVENTOR.
MAX MERZ
BY Cook + Robinson
ATTORNEYS Patented Nov. 22, 1949

2,488,599

UNITED STATES PATENT OFFICE 2,488,599

CENTRIFUGAL CLUTCH

Max Merz, Seattle, Wash.

Application March 24, 1945, Serial No. 584,558

3 Claims. (Cl. 192—105)

This invention relates to clutches, and it has reference more particularly to an improved type of automatic clutch applicable to various uses, but especially designed for use in the driving mechanism of timber saws; it being the principal object of the invention to provide a clutch mechanism, adapted to be interposed in the driving mechanism between the engine drive shaft and the saw driving gear, comprising a driven clutch head which, incident to its rotation and under the influence of centrifugal force, is caused to functionally engage a clutch drum, and wherein the driving connection or contact between driving and driven parts of the clutch become ineffective at a slow speed or at what might be called stalling speed so that the clutch becomes automatically disengaged under this condition.

More specifically stated, the invention resides in the provision of an automatic clutch designed for use in the driving mechanism of power saws and whereby the clutch becomes disengaged when the saw becomes stuck or pinched for any particular reason, and thereby prevents stalling the engine, and damage to saw or engine mechanism.

Still further objects of the present invention reside in the details of construction of parts embodied in the clutch, in their relationship and mode of operation, as will hereinafter be fully described.

In accomplishing these and other objects of the invention, I have provided the improved details of construction, the preferred forms of which are illustrated in the accompanying drawings, wherein:

Fig. 1 is an enlarged, sectional view of the clutch mechanism in an axial plane.

Fig. 2 is a cross section on line 2—2 in Fig. 1.

Fig. 3 is a cross section on line 3—3 in Fig. 1.

Fig. 4 is a face view of one of the clutch shoes.

Referring more in detail to the drawings:

In Fig. 1, 25 designates an engine driven shaft and 20 designates a shaft that is coaxially aligned therewith and which may be driven, through the mediacy of the present clutch mechanism, to drive a saw or other device used therewith. This clutch mechanism will now be described.

The clutch comprises a part which will be hereinafter referred to as the clutch head, and a part which will be referred to as the clutch drum. The head rotates with the engine drive shaft and it comprises a plurality of arcuate segments that are caused to be pressed by centrifugal force against the drum to effect the driving of the latter, which, in turn, drives the saw. The clutch head is designated in its entirety by reference numeral 30.

The engine drive shaft 25 has its outer end portion contained within the hub portion 30' of the clutch head and, as noted best in Fig. 1, the shaft has an end portion of reduced diameter that is keyed, as at 31, in the said hub and the head is held in place on the shaft end, against endwise movement, by a bolt 32 that is applied through a washer 33 and threaded into the shaft end; the washer being seated against a shoulder 34 that is formed by a counterbore in the hub.

The hub 30' is formed about one end with two spaced, annular flanges 35 and 36 setting off an intermediate channel 37 in which the three segmental shoes 38—38—38 of the clutch head are contained for radial movement. Each segment 38 of the clutch head extends through an arc of approximately 120°, and as shown best in Fig. 4, has a cylindrically curved flange 38a and these flanges are adapted to cooperatively engage with the inside surface of the cylindrical flange 39 of the clutch drum 40 which is fixed on the inner end of the transmission shaft 20.

Formed on the side face of each shoe or segment of the clutch head, is a projecting lug 41, and these lugs are slidably fitted in radially directed slots 42 in the flange 35, thus allowing the arcuate outer surfaces of the segments to be moved into and from frictional driving contact with the drum flange while maintaining their driven connection with the hub member.

Interposed between the shoes or segments are coiled springs 45 designed to urge the shoes yieldingly apart and into driving contact with the drum flange under slight pressure. These springs are seated at their opposite ends in sockets 46 in the adjacent radial surfaces of the shoes.

In order that the shoes may be held entirely disengaged from the drum flange, when such is desired, I have applied a sleeve 48 about the hub portion 30' of the clutch head. This sleeve is slidably adjustable on the hub, in its longitudinal direction, and at its inner end it has an encircling, conically tapering cam surface 50 that cooperatively underlies the inner end portions of the inwardly directed arms 51a of three bell crank levers 51 which are pivotally mounted on pivot pins 52 carried by paired ears 53 formed on the inner face of the flange 36. The outer arms 51b of the three levers extend through slots 55 in the flange 36 and into sockets 56 in the adjacent side surfaces of the shoes, respectively. The arrangement of parts is such that when the sleeve is fitted inwardly, that is, toward the engine, the cam surface 50 engages the arms 51a of the bell-cranks and rocks them, to cause the arms 51b to move the shoes inwardly toward the axis of rotation and thus to be held disengaged from the drum.

For the purpose of shifting the sleeve, I have applied a collar 60 thereto, carried by anti-friction bearings 61. The collar has radially extending trunnions 60' at opposite sides and these are pivoted in the opposite side arms 62—62 of a bifurcated lever 63 which arms are pivoted at their ends to the housing. The other end of the lever has a flexible rod or shaft connection 65 with an adjusting grip member 66 at the end of a handle 17; the connection being such that rotation of the grip shifts it lengthwise of the handle, and this in turn, through the cable 65, rocks the lever and shifts the sleeve, either to disengage the shoes or to release them for engagement with the drum.

With the parts so constructed and assembled, it is quite apparent that with the shoes released for contact with the drum flange, centrifugal force will cause them to be firmly pressed into holding contact with the drum flange, and the higher the rate of rotation, the greater will be the holding and driving effect on the drum. However, if the saw should bind or stick, this will slow down the speed of the engine to an extent that centrifugal force in the clutch head will not hold the driving connection between shoes and drum, and the clutch will slip to an extent to prevent the stalling of the engine.

Having thus described my invention, what I claim as new therein and desire to secure by Letters Patent is:

1. In combination, a driving shaft, a driven shaft alined therewith, and a clutch; said clutch comprising a clutch head having a hub portion fixed on the driving shaft and having spaced annular flanges thereabout and there being radial slots in one of said flanges, a drum mounted on the driven shaft and coaxially enclosing the head, clutch shoes arranged about the head between said flanges and having lugs thereon guided in the radial slots of one flange effecting a driving connection between the shoes and head, and yielding means acting against the shoes to urge them into driving contact with the drum.

2. In combination, a driving shaft, a driven shaft alined therewith and a clutch; said clutch comprising a clutch head having a hub portion fixed on the driving shaft and having spaced annular flanges thereabout and there being radial slots in one of said flanges, a drum mounted on the driven shaft and coaxially enclosing the head, clutch shoes arranged about the head between said flanges and having lugs thereon guided in the said radial slots and effecting a driving connection between the shoes and head, yielding means acting on the shoes to normally retain them in driving contact with the drum, bell crank levers mounted on the head, each with a lever arm engaged with a shoe, a cam sleeve longitudinally slidable on the hub portion of the head and engageable with the other lever arms of the bell crank levers to move the shoes from driving contact with the drum, and means for shifting the sleeve.

3. In combination, a driving shaft, a driven shaft aligned therewith, and a clutch; said clutch comprising a clutch head having a hub portion fixed on the driving shaft and having spaced annular flanges thereabout at one end of the hub, and there being radial slots in said flanges, a cam sleeve slidable on the other end portion of the hub, a drum mounted on the driven shaft and coaxially enclosing the head, clutch shoes arranged about the head between the spaced flanges and having lugs thereon guided in the radial slots of that flange that is farthest from the cam sleeve and effecting a driving connection between the shoes and head, springs interposed between the shoes and acting thereon to urge them with limited force into driving contact with the drum, bell crank levers pivotally mounted on the flange that is nearest the cam sleeve, having arms extended through the radial slots of said flange into actuating contact with said shoes, and having their other arms simultaneously engageable by the cam sleeve for moving the shoes out of contact with the drum, and means for shifting the said cam sleeve to engage or disengage the shoes and drum.

MAX MERZ.

REFERENCES CITED

The following references are of record in the file of this patent:

UNITED STATES PATENTS

| Number | Name | Date |
|---|---|---|
| 1,045,480 | Wallmann | Nov. 26, 1912 |
| 1,227,475 | Matheeuwissen | May 22, 1917 |
| 1,597,326 | Mercer | Aug. 24, 1926 |
| 1,715,351 | Bruckmann | June 4, 1929 |
| 1,910,352 | Moyer | May 23, 1933 |
| 2,027,941 | Waterhouse | Jan. 14, 1936 |
| 2,077,292 | Waseige | Apr. 13, 1937 |

FOREIGN PATENTS

| Number | Country | Date |
|---|---|---|
| 582,131 | Germany | Aug. 9, 1933 |